C. E. CLINE.
ANIMAL RESTRAINING DEVICE.
APPLICATION FILED APR. 11, 1919.
1,327,374. Patented Jan. 6, 1920.
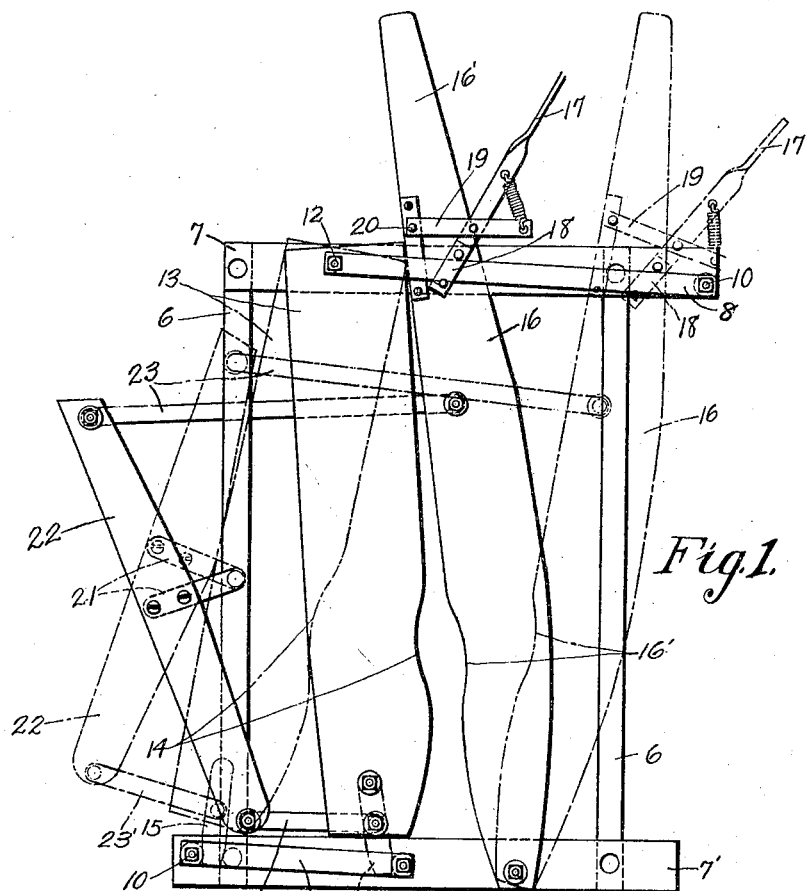
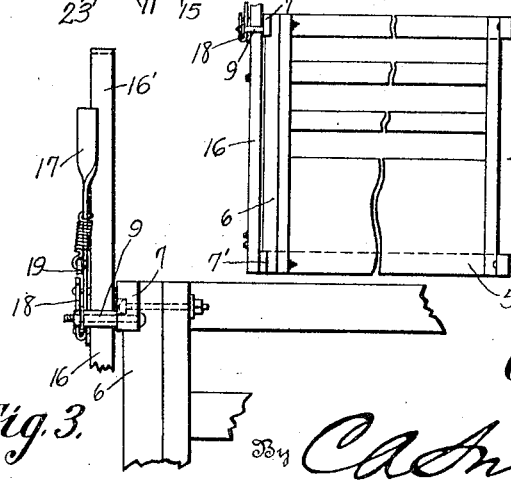
Inventor
C. E. Cline

UNITED STATES PATENT OFFICE.

CHARLES E. CLINE, OF ABINGDON, ILLINOIS.

ANIMAL-RESTRAINING DEVICE.

1,327,374.  Specification of Letters Patent.  Patented Jan. 6, 1920.

Application filed April 11, 1919. Serial No. 289,265.

*To all whom it may concern:*

Be it known that I, CHARLES E. CLINE, a citizen of the United States, residing at Abingdon, in the county of Knox and State of Illinois, have invented a new and useful Animal-Restraining Device, of which the following is a specification.

This invention relates to animal restraining devices, the primary object being to provide a hog trap or holder which will effectively retain the hog in position where the same may be operated upon with facility and which will not injure or scar the animal.

It is another object of this invention to provide a device for catching and holding animals which may be placed near the gate of the pen so that the animal will be caught as it passes through the gate and which may be operated with ease.

Another object of the invention resides in the provision of a hog trap wherein the device is automatically locked against movement after the same has been operated to restrain the hog, the same mechanism serving to retain the device in locked open position.

An additional object is to provide a restraining device which is of the utmost simplicity in construction, consists of few parts that may be readily disassembled, and which is inexpensive to manufacture.

With the above and other objects in view which will be enlarged upon hereinafter and illustrated in the accompanying drawing, the invention consists of combinations of elements, arrangement of parts, details of construction and general assemblage which will be specifically referred to.

On the drawings:—

Figure 1 is a front elevation of my improved hog trap, the device being shown in closed position in full lines and in open position in dotted lines; Fig. 2 is a side elevation of the trap; and Fig. 3 is a fragmental end elevation of the same taken at the right-hand upper end of the device.

Referring to the drawing wherein like characters of reference designate like parts, the numeral 5 designates the floor or platform of my device, to which is connected the vertical side walls 6. The side walls 6 are connected by upper and lower cross bars 7 and 7'.

Extending in parallel relation to one of the upper cross bars 7 and in spaced relation thereto is a guide bar 8 which is held in spaced relation by a sleeve 9 through which extends a bolt 10 that also extends through the upper cross bar 7 above mentioned. A second guide bar 11 is secured to the lower bar 7' below the guide bar 8 and is also arranged in spaced relation to this cross bar.

Pivotally mounted between the end of the guide bar 8 and the upper bar through the medium of a pivot 12 is a movable jaw 13 which is provided with a recess 14 in its longitudinal edge adjacent its lower end which is of a shape to conform to the animal's neck. The lower end of this jaw carries a finger 15 that is disposed in the guide 11 and movable longitudinally therein.

A second jaw 16 is pivotally mounted upon the lower bar 7' and is disposed between the guide 8 and the upper bar 7 and adapted for longitudinal movement therein. This jaw 16 is provided with a recess 16' which coincides with the recess in the jaw 13. The upper end of the jaw terminates in a handle 16'. An operating lever 17 is provided having a loop 18 formed upon its lower end by bending the end of the handle upon itself. This loop is slidably mounted on the guide bar 8 and is adapted to bind on the same, when the jaw 13 reaches the limit of its movement in either direction.

A link 19 is pivotally connected with the lever 17 and has one end pivotally connected with the movable jaw 16 as indicated at 20. The end of the link has one end of a contractile coil spring connected thereto which in turn is connected with the lever 17 and normally retains this lever in a position where the loop 18 will bind on the guide bar 8.

A connection 21 is pivotally mounted upon one of the side walls 6 at its forward end and adjacent the bottom cross beam 7'. This connection is operatively connected with a vertically extending lever 22 which has its inner longitudinal face beveled toward its ends so that the lever will have free movement and not abut the jaw 13. A relatively long link 23 has one end pivotally connected with the jaw 16 and its opposite end pivoted to the upper end of the lever 22. A link 23' is pivoted to the lower end of the lever 22 and to the movable jaw 13.

In the operation of the device the operator grasps the jaw 16 by its handle 16' and moves the same forwardly, this causes the two jaws to move together through the medium of their link connections and the hog or other animal is caught between the same.

The embodiment of the invention herein illustrated and described is considered to be the preferred construction but it is to be understood that the invention is susceptible to various modifications and that my limits of modification are only governed by the subjoined claims.

What is claimed is:

1. In a restraining device, a stall, a pair of coöperating jaws pivoted at the forward end of the same, a lever pivoted at its middle to the stall, a guide bar disposed at the upper end of the stall, one of the jaws being longitudinally movable between the guide and upper part of the stall, a link pivotally connected with one of the jaws, a lever pivotally connected with the link, a loop carried thereby and slidable on the guide adapted to bind thereon when the jaws are in closed or open position, a link operatively connecting one of the jaws and the first mentioned lever together, and a link connecting the latter and the remaining jaw.

2. In a device for restraining animals, a stall comprising a bottom and vertical side walls connected thereto, cross bars connecting the walls at their upper and lower ends, a guide bar disposed in spaced relation to each of the forward cross bars, a jaw pivoted between the upper cross bar and the end of the guide, a finger carried by the jaw and movable in the bottom guide, a second jaw pivoted to the bottom cross bar and movable behind the upper guide, a lever pivotally mounted on the stall and extending vertically of the same, a link connected with one of the jaws and with the upper end of the lever, a second link pivotally connected with the lower end of the lever and the remaining jaw, a link pivoted on one of the jaws, a lever pivotally connected with the link, a loop formed thereon and disposed on the guide bar and longitudinally thereon, a contractile spring connected with the lever and the end of the link for normally retaining the lever in a position where the loop will bind thereon, and a handle carried by one of the jaws.

3. In a restraining device, a stall including, horizontally disposed cross bars extending transversely of the stall at its upper and lower ends, a guide bar extending longitudinally of the upper cross bar and in spaced relation thereto, a gripping jaw having its upper end pivotally mounted between one end of the guide bar and the upper cross bar, a guide operatively connected with the lower end of the gripping jaw, a second gripping jaw to coact with the first gripping jaw having its lower end pivoted to the lower cross bar and its upper end movable between the upper cross bar and guide bar, a lever pivotally mounted on the latter gripping jaw having a loop formed at one end thereof slidably engaged upon the guide bar, and means connecting the jaws together whereupon moving the last mentioned gripping jaw in one direction the other jaw will be caused to move in the opposite direction, and means for normally retaining the lever in a position where the loop will bind on the guide bar and retain the jaws against movement.

4. In a restraining device a stall including upper and lower cross bars, a pair of coacting gripping jaws, one having one end pivoted to the lower cross bar and the other having its upper end pivoted to the upper cross bar, a guide bar arranged in spaced relation to the upper cross bar and upon the outer face of the jaw pivoted to the lower cross bar, the latter jaw being capable of pivotal movement between the upper cross bar and the guide bar, a link having one end pivoted to the last mentioned jaw, a hand lever pivoted to the link intermediate its ends having a loop formed at one end thereof slidably engaged upon the guide bar, a contractile spring having one end secured to the lever and its opposite end fixed to the free end of the link to normally retain the lever in a position where the loop will bind upon the guide bar, and links operatively connecting both jaws whereby upon moving the jaw carrying the lever in one direction, the other jaw will be caused to move in the opposite direction.

In testimony that I claim the foregoing as my own, I have hereto affixed my signature in the presence of two witnesses.

CHAS. E. CLINE.

Witnesses:
F. W. McCLURE,
R. F. CASE.